(12) United States Patent
Cobb

(10) Patent No.: US 12,730,246 B2
(45) Date of Patent: Sep. 8, 2026

(54) SYSTEM FOR MONITORING CONDITIONS AT A LOCATION

(71) Applicant: Ram Companies, LLC, St. Paul, MN (US)

(72) Inventor: Joseph C Cobb, Medina, OH (US)

(73) Assignee: Ram Companies, LLC, St. Paul, MN (US)

( * ) Notice: Subject to any disclaimer, the term of this patent is extended or adjusted under 35 U.S.C. 154(b) by 366 days.

(21) Appl. No.: 18/261,870

(22) PCT Filed: Jan. 31, 2022

(86) PCT No.: PCT/US2022/014498
§ 371 (c)(1),
(2) Date: Jul. 18, 2023

(87) PCT Pub. No.: WO2022/165303
PCT Pub. Date: Aug. 4, 2022

(65) Prior Publication Data
US 2024/0077645 A1 Mar. 7, 2024

Related U.S. Application Data

(60) Provisional application No. 63/144,083, filed on Feb. 1, 2021.

(51) Int. Cl.
*G01W 1/06* (2006.01)
*G01W 1/14* (2006.01)
(Continued)

(52) U.S. Cl.
CPC ................ *G01W 1/06* (2013.01); *G01W 1/14* (2013.01); *G01D 21/02* (2013.01); *G01W 1/02* (2013.01)

(58) Field of Classification Search
USPC .............................................................. 702/3
See application file for complete search history.

(56) References Cited

U.S. PATENT DOCUMENTS 4,360,856 A * 11/1982 Witthaus ................ H01H 47/32 361/170
2004/0039489 A1* 2/2004 Moore .................. A01G 25/16 700/284
(Continued)

FOREIGN PATENT DOCUMENTS

CN 209979886 U 1/2020
CN 210 894 748 6/2020
(Continued)

OTHER PUBLICATIONS

EP Search Report in EP Application No. 22746781.8, dated Feb. 11, 2025, 12 pages.

*Primary Examiner* — Paul D Lee
(74) *Attorney, Agent, or Firm* — Todd R. Fronek; Larkin Hoffman Daly & Lindgren, Ltd.

(57) ABSTRACT

A system for monitoring conditions at a location, such as a roof of a building comprises a superstructure, a power supply, a sensor array, and a central processor. The sensor array may comprise a plurality of data sensors. Each data sensor may be physically connected to the superstructure, and electrically connected to the power supply. The central processor may be configured to receive a plurality of inputs from the plurality of data sensors and communicate the plurality of inputs to a receiver.

20 Claims, 7 Drawing Sheets

(51) Int. Cl.
*G01D 21/02* (2006.01)
*G01W 1/02* (2006.01)

(56) References Cited

U.S. PATENT DOCUMENTS

| | | | | |
|---|---|---|---|---|
| 2008/0210024 | A1 | 9/2008 | Merlo | |
| 2017/0318921 | A1* | 11/2017 | Gharabegian | F24S 30/452 |
| 2018/0024271 | A1* | 1/2018 | Koch | G01W 1/14<br>702/3 |
| 2018/0106825 | A1 | 4/2018 | Williams | |
| 2018/0203158 | A1* | 7/2018 | Ulmer | G01S 17/86 |
| 2019/0004210 | A1* | 1/2019 | Altschule | G01W 1/14 |
| 2019/0026359 | A1* | 1/2019 | Park | G06F 16/00 |
| 2020/0400127 | A1 | 12/2020 | Lowenhar | |

FOREIGN PATENT DOCUMENTS

| | | |
|---|---|---|
| IT | 2018 0000 9114 | 4/2020 |
| JP | 2012112940 A | 6/2012 |

* cited by examiner

SYSTEM FOR MONITORING CONDITIONS AT A LOCATION

This application claims priority from International Application No. PCT/US2022/014498 filed on 31 Jan. 2022 and United States Provisional Application No. 63/144,083 filed on 1 Feb. 2021, the teachings of each of which are incorporated by reference herein in their entirety.

BACKGROUND

Many surfaces benefit from frequent inspection and evaluation during their operational life to determine when the surface may require repair, replacement, or other remediation. Some surfaces may also benefit from inspection and evaluation during installation of the surface to ensure that the surface is being properly installed and detect if/when the surface may have been damaged during installation. Examples of such surfaces may include a roof of a building, a parking lot surface, a road surface, a bridge deck, and the like.

Traditionally inspection and evaluation of surfaces during their operational life and/or during installation requires the physical presence of a person to observe the surface and make various measurements. Such methods are expensive, time consuming, do not allow for constant monitoring and evaluation of the surface, and can often overlook critical changes in conditions at or near the surface which can affect the integrity of the surface. Additionally, the existing methods suffer from delays in identifying issues which may require repair, replacement, or remediation as it takes time for the person inspecting the surface to log their observations and measurements.

The need exists, therefore for an improved system and method for inspecting and evaluating a surface during the operational life of the surface and/or during installation of the surface.

SUMMARY

It is described herein, a system for monitoring conditions at a location. The system may comprise a superstructure, a power supply, a sensor array, and a central processor. The sensor array may comprise a plurality of data sensors comprising at least one thermometer, at least one barometer, at least one anemometer, at least one pyranometer, and at least one rain gauge. Each data sensor of the plurality of data sensors may be physically connected to the superstructure, and electrically connected to the power supply. The central processor may be configured to receive a plurality of inputs from the plurality of data sensors and communicate the plurality of inputs to a receiver.

In certain embodiments, the rain gauge may comprise a type of rain gauge selected from the group consisting of a tipping bucket, a taguchi SnO rain gauge, a differential pH rain gauge, a catalytic LEL rain gauge, an infrared LEL rain gauge, and combinations thereof.

In some embodiments, the at least one thermometer may comprise a type of thermometer selected from the group consisting of a radiometric thermometer, an atmospheric thermometer, a contact thermometer, and combinations thereof.

The plurality of data sensors may further comprise at least one data sensor selected from the group consisting of at least one photoionization detector, at least one hygrometer, at least one wind vane, at least one ceilometer, at least one snow scale, at least one piezoelectric sensor, at least one transmissometer, at least one disdrometer, at least one flow meter, at least one capacitance meter, at least one potentiometer, at least one ultraviolet meter, at least one photoresistor sensor, at least one corona meter, at least one acoustic meter, at least one optical fiber, at least one video camera, and combinations thereof. When present, the at least one potentiometer may be selected from the group consisting of a law potentiometer, a linear taper potentiometer, and combinations thereof.

The power supply may be selected from the group consisting of solar, wind, battery, or hard wires to an electrical grid.

In some embodiments, the superstructure may comprise a base and a plurality of arms extending from the base. In certain such embodiments, each arm of the plurality of arms may be pivotably connected to the base by a hinge. In some embodiments, the base may comprise a plurality of base perimeter members. In certain such embodiments, two opposing base perimeter members of the plurality of base perimeter members may comprise a hinge located equidistant from one another along a length dimension of the respective base perimeter member.

In certain embodiments, the location may be a roof of a building. In such embodiments, the superstructure may be configured to be physically connected to at least a portion of the roof of the building.

DETAILED DESCRIPTION

Disclosed herein is a system for monitoring conditions at a location. The system is described below with reference to the Figures. As described herein and in the claims, the following numbers refer to the following structures as noted in the Figures.

5 refers to a roof.
10 refers to a system.
100 refers to a superstructure.
110 refers to a base.
112 refers to a base perimeter member.
120 refers to an arm.
130 refers to a cradle.
140 refers to an adapter.
150 refers to a pivot member.
200 refers to a power supply.
300 refers to a sensor array.
301 refers to a thermometer.
302 refers to a barometer.
303 refers to an anemometer.

304 refers to a pyranometer.
305 refers to a rain gauge.
306 refers to a photoionization detector.
307 refers to a hygrometer.
308 refers to a wind vane.
309 refers to a ceilometer.
310 refers to a snow scale.
311 refers to a piezoelectric sensor.
312 refers to a transmissometer.
313 refers to a disdrometer.
314 refers to a flow meter.
315 refers to a capacitance meter.
316 refers to a potentiometer.
317 refers to an ultraviolet meter.
318 refers to a photoresistor sensor.
319 refers to a corona meter.
320 refers to an acoustic meter.
321 refers to an optical fiber.
322 refers to a video camera.
400 refers to a central processor.
410 refers to a receiver.

Figure 1:
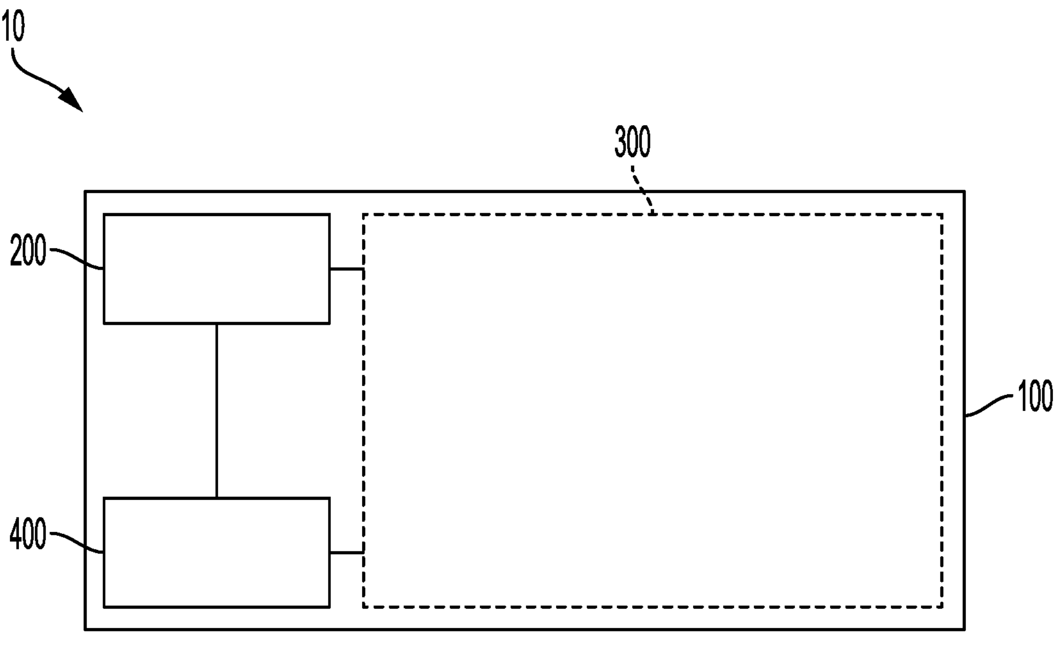
FIG. 1 is a block diagram of an embodiment of a system for monitoring conditions at a location.

FIG. 1 depicts a block diagram of one embodiment of a system (10) for monitoring conditions at a location. As shown in FIG. 1, the system may comprise a superstructure (100), a power supply (200), a sensor array (300), and a central processor (400).

Figure 2:
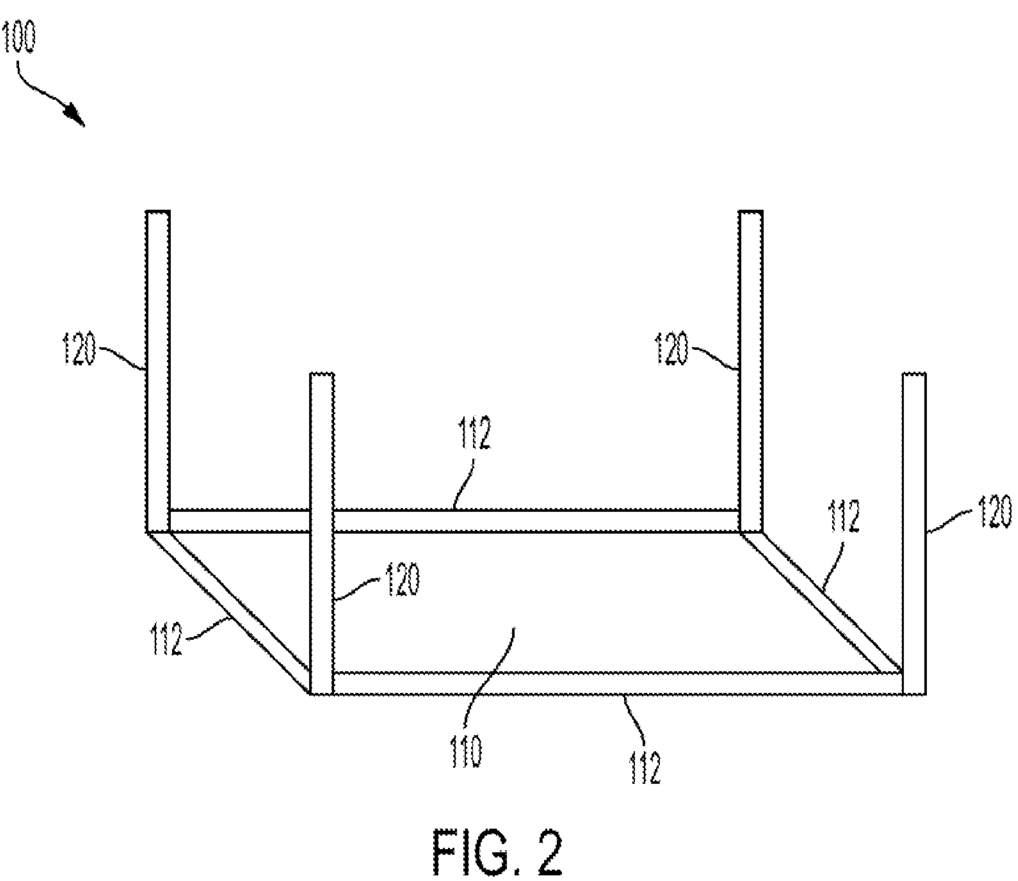
FIG. 2 is a perspective view of a superstructure for a system for monitoring conditions at a location.

FIG. 2 depicts a perspective view of one embodiment of a superstructure (100) for a system for monitoring conditions at a location. As shown in FIG. 2, the superstructure may comprise a base (110) and a plurality of arms (120) extending from the base. The base may comprise a plurality of base perimeter members (112) connected to one another to form a base perimeter as shown in FIG. 2. Each arm, and each base perimeter member may be made of a rigid material such as steel, aluminum, or rigid plastics. Examples of such rigid plastics include polyvinyl chloride (PVC), high density polyethylene (HDPE), and polyamides (PA).

While FIG. 2 shows one embodiment of a superstructure (100), one of ordinary skill will recognize that many other embodiments of a superstructure may exist. The specific size, shape, and configuration of the superstructure used in any one application may be dependent upon a number of variables including—but not limited to—the specific location at which the conditions are being monitored, the number and type of sensors included in the sensor array, the type of power supply, and the type of central processor. Preferably the superstructure will be configured to allow for one or more of the sensors of the sensor array (300) to be exposed to atmosphere when the system is deployed at a location.

Preferably, the superstructure will be easily portable. By easily portable it is meant that the superstructure may be packed in a case which meets standard commercial airline regulations for size and weight of checked luggage. To do so, in some embodiments, the superstructure may be collapsible. A collapsible superstructure may comprise a plurality of hinges. Each hinge of a first subset of the plurality of hinges may be configured to connect one of the arms (120) of the plurality of arms to the base (110). The hinge therefore allows the corresponding arm to pivot between a fully extended position as shown in FIG. 2 and a fully retracted position in which the arm is substantially parallel with a base perimeter member (112). In some embodiments, one or more of the hinges may include a locking mechanism which permits the hinge to be configured in a partially extended position between the fully extended position and the fully retracted position.

In certain embodiments, a second subset of the plurality of hinges may be configured to attach along a length of one of the base perimeter members (112). Preferably there will be at least two hinges within the second subset of the plurality of hinges with each such hinge being located equidistant with one another along the length dimension of opposing members of the base perimeter members. The second subset of the plurality of hinges therefore allows the base (110) to fold in half (or in thirds, in quarters, etc.) to reduce the size profile of the superstructure and allow for easier portability.

Figure 3:
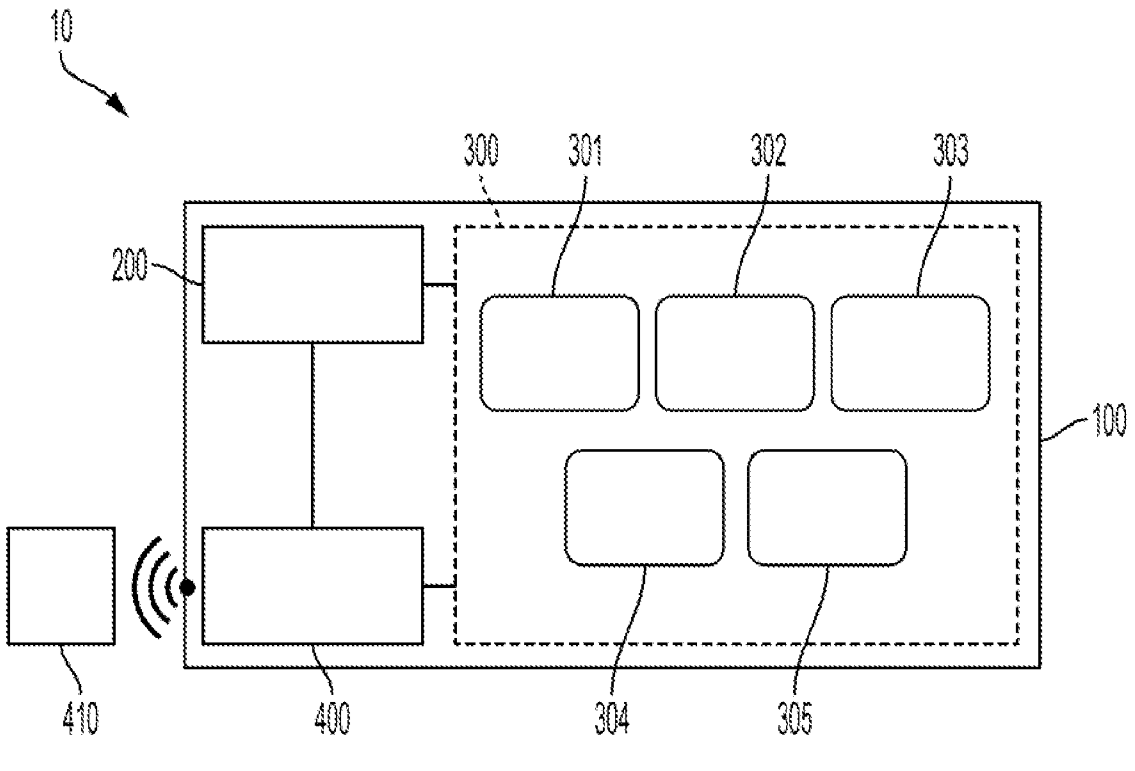
FIG. 3 is a block diagram of an embodiment of a system for monitoring conditions at a location.

FIG. 3 depicts a block diagram of one embodiment of a system (10) for monitoring conditions at a location. As shown in FIG. 3, the sensor array (300) may comprise a plurality of data sensors. Each data sensor of the plurality of data sensors may be physically connected to the superstructure (100). Physically connecting the data sensors to the superstructure may take many forms. The simplest form of connecting the data sensors to the superstructure utilizes one or more fasteners such as a screw, a bolt, a rivet, a clamp or the like. Another form of connecting the data sensors to the superstructure may include the use of an adhesive such as glue, tape, epoxy, or the like. In another form of connecting the data sensors to the superstructure, the connection may include a permanent connection such as embedding one or more of the sensors within a component of the superstructure or welding one or more of the sensors to the superstructure. It can therefore be said that each individual data sensor of the plurality of data sensors may be physically connected to the superstructure by a connection mechanism selected from the group consisting of a fastener, an adhesive, a permanent connection mechanism, and combinations thereof.

Figure 6:
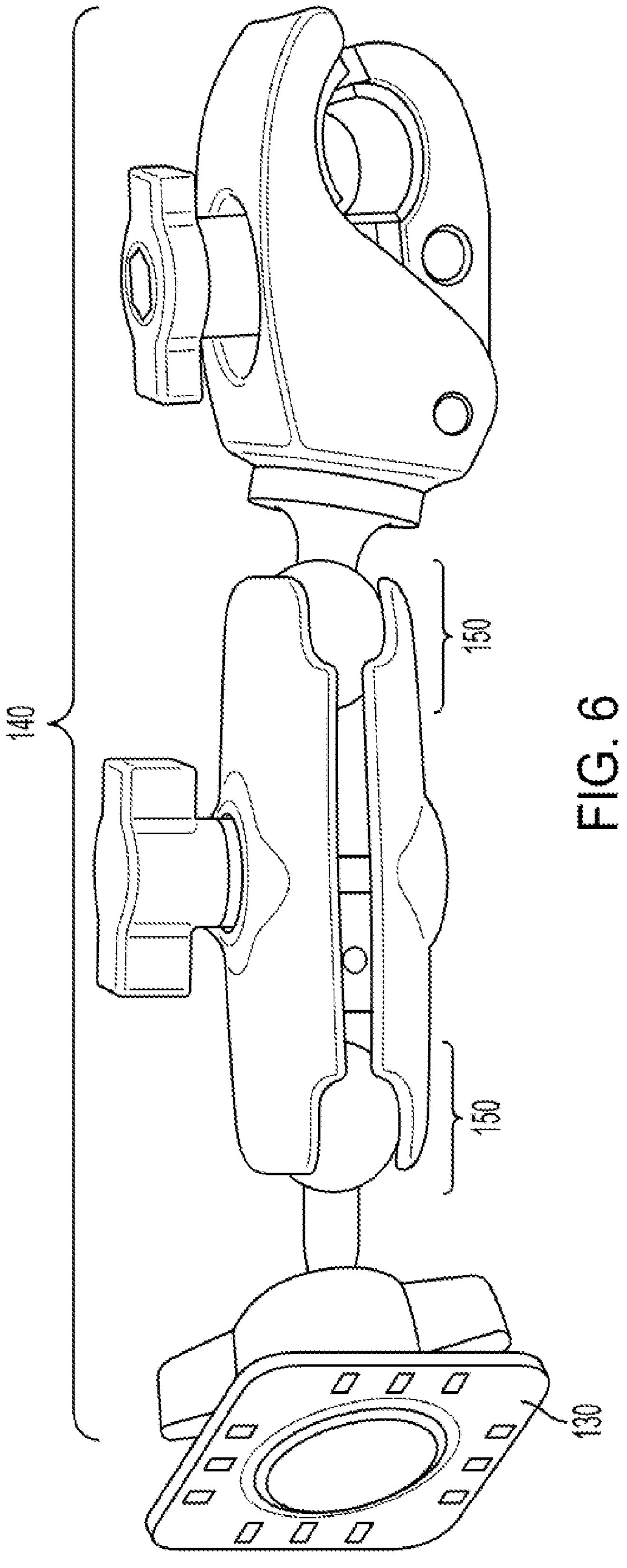
FIG. 6 is a perspective view of one embodiment of a connection mechanism for connecting a data sensor to a superstructure.
Figure 7:
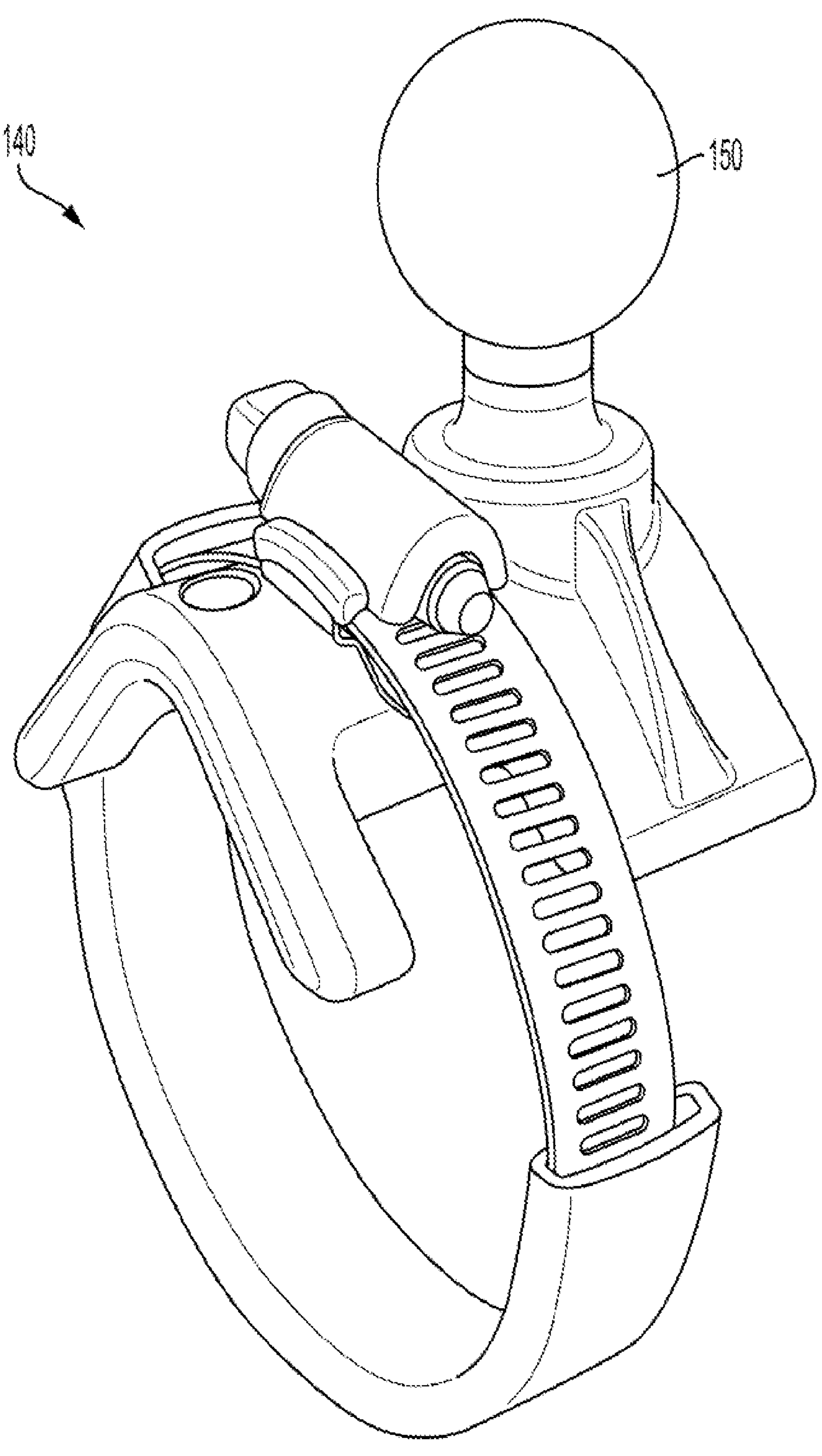
FIG. 7 is a perspective view of an alternative embodiment of a connection mechanism for connecting a data sensor to a superstructure.

One example of a preferred connection mechanism for connecting a data sensor to the superstructure (100) may include a cradle (130) and an adapter (140) as shown in FIG. 6 and FIG. 7. The data sensor may be connected to the cradle such that the cradle holds or houses the data sensor. Each cradle may be configured to the shape and size of the individual data sensor with multiple points of contact between an interior surface of the cradle and an exterior surface of the data sensor.

The cradle (130) may then be connected to the superstructure (100) by an adapter (140). Preferably the adapter will include a superstructure fastening mechanism connected to a cradle fastening mechanism. Preferably each of the superstructure fastening mechanism and the cradle fastening mechanism will be a detachable fastening mechanism allowing the cradle to be easily disconnected from the superstructure. Examples of detachable fastening mechanisms include a threaded rod with a nut, a tongue and groove fastener, a clamp, or the like.

In some embodiments the superstructure fastening mechanism may be connected to the cradle (130) fastening mechanism via a pivot member (150). When used, the pivot member allows the cradle to pivot about multiple axes so that the orientation of the data sensor may be adjusted. One example of a pivot member may comprise a ball and socket joint.

Each data sensor of the plurality of data sensors may also be electrically connected to the power source (200). The power source may be selected from the group consisting of solar, wind, battery, or hard wire to an electrical grid.

A solar power source may comprise one or more photovoltaic panels (often referred to as a "solar panel"). The photovoltaic panel(s) are known to convert energy from sunlight to electricity. This electricity can then be transmitted to one or more of the data sensors as electrical current passed through one or more wires or cables which electrically connect the data sensor(s) to the solar power source.

A wind power source may comprise one or more wind turbines rotationally connected to an electric generator. As wind passes around the blades of the wind turbine, the wind turbine rotates, thereby rotating the electric generator. Electricity generated by the rotation of the electric generator can then be transmitted to one or more of the data sensors as electrical current passed through one or more wires or cables which electrically connect the data sensor(s) to the wind power source.

A battery power source may comprise one or more electrochemical cells with external electrical connections (i.e.—a battery). The electrochemical cells are capable of storing electricity. This electricity can then be transmitted to one or more of the data sensors as electrical current passed through one or more wires or cables which electrically connect the data sensor(s) to the external electrical connections of the electrochemical cell. Certain electrochemical cells may be capable of replenishing the stored electricity (i.e.—recharging the battery) by electrically connecting the electrochemical cell to a solar power source, a wind power source, a hard wire to an electrical grid, or the like.

A hard wire to an electrical grid power source may comprise an interconnected network for delivering electricity from a generating station to a specific location. Electricity from the generating station is carried across high voltage transmission lines—which often pass through electrical substations for stepping the electrical voltage up or down—which are then connected to distribution lines that extend to the individual location. Once the electricity arrives at the individual location, it may be transmitted to one or more of the data sensors as electrical current passed through one or more wires or cables which electrically connect the data sensor(s) to the electrical grid.

Electrically connecting data sensor(s) to the power source (200) allows the data sensor(s) to receive electrical current from the power source. This electrical current may then be used to power various operations of the data sensor(s). Such operations may include electrical components used to detect certain conditions (also referred to herein as parameters) at or around the data sensor, and electrical components used to transmit data regarding conditions at or around the data sensor to the central processor.

In FIG. 3, the plurality of data sensors of the sensor array (300) may comprise at least one thermometer (301), at least one barometer (302), at least one anemometer (303), at least one pyranometer (304), and at least one rain gauge (305). While these data sensors are considered useful for most applications of the system, not all applications will include each of these data sensors. In certain other embodiments—such as that shown in FIG. 4—additional data sensors may be included in the sensor array in addition to or instead of the data sensors shown in FIG. 3.

As used herein and in the claims, a thermometer (301) refers to a device that measures a temperature or temperature gradient parameter. In general, a thermometer may comprise a thermocouple electrically connected to a digital voltmeter to measure the thermocouple output, and an electronic display (although in some embodiments the electronic display may be a part of the central processor and/or the receiver). Different types of thermometers which function in different ways are known to exist in the art. Types of thermometers from which the thermometer may be selected include a radiometric thermometer, an atmospheric thermometer, a contact thermometer, and combinations thereof.

As used herein and in the claims, a barometer (302) refers to a device that measures air pressure parameters in an environment. In general, a barometer may comprise a pressure sensitive material—such as water, liquid mercury, or an aneroid cell—connected to or housed within a measuring scale. As atmospheric pressure in the environment changes, the force applied to the pressure sensitive material will change the display reading on the measuring scale. Increases in atmospheric pressure will result in a corresponding increase in the display reading on the measuring scale while decreases in atmospheric pressure will result in a corresponding decrease in the display reading on the measuring scale.

As used herein and in the claims, an anemometer (303) refers to a device that measures wind speed and direction parameters. In general, an anemometer may comprise a wind capturing device—such as a bladed fan or a series of cups connected to a central axis—mounted on a vertical shaft. As wind speed (i.e.—velocity) changes, the rate at which the wind capturing device rotates changes. As wind directionality changes, the direction in which the wind capturing device rotates changes.

As used herein and in the claims, a pyranometer (304) refers to a device that measures solar irradiance parameters on a planar surface. In general, a pyranometer may comprise at least one dome, a black absorber, a thermopile, and a main pyranometer body. The dome(s) filter solar radiation in certain wavelengths (generally blocking wavelengths greater than 3 μm and transmitting wavelengths in the range of between 0.3 and $3\times10^{-6}$ m). Solar radiation in the transmitted wavelengths is then absorbed by the black absorber and converted to heat creating a measurable temperature gradient with the thermopile which can be used to calculate solar irradiance parameters.

As used herein and in the claims, a rain gauge (305) refers to a device that measures the amount of liquid precipitation parameter over an area in a defined period of time. In general, a rain gauge may comprise a vessel for gathering precipitation, and a scale for measuring the amount of precipitation gathered in the vessel. The scale may be based on a number of different measurement types with common measurements including volume measurements and weight measurements. Different types of rain gauges which function in different ways are known to exist in the art. Types of rain gauges from which the rain gauge may be selected include a tipping bucket, a taguchi SnO rain gauge, a differential pH rain gauge, a catalytic LEL rain gauge, an infrared LEL rain gauge, and combinations thereof.

Once installed at a location, the system disclosed herein communicates input(s) from the data sensor(s) to a central processor (400) for communication to at least one receiver (410) for data logging, display, analytical, and triggering events. These inputs may correspond to detection of at least one parameter by one or more of the data sensors. The central processor may be a computer or a security system located at or in the vicinity of the system. The receiver may be a second computer located remotely from the location. The system may be in communication with the at least one receiver via a hard wire connection—such as a fiberoptic or ethernet cable—or through a wireless or Bluetooth connection.

The input may be communicated to the central processor by a variety of different communication methods. Specific non-limiting examples of such communication methods include wireless internet communication, blue tooth, near-field communication (NFC) protocol, wireless mobile telecommunication (i.e.—3G, 4G, or 5G), wired network communication (i.e.—Cat5, Cat5e, Cat6, or Cat8 cable or the like), and fiberoptic communication.

Figure 4:
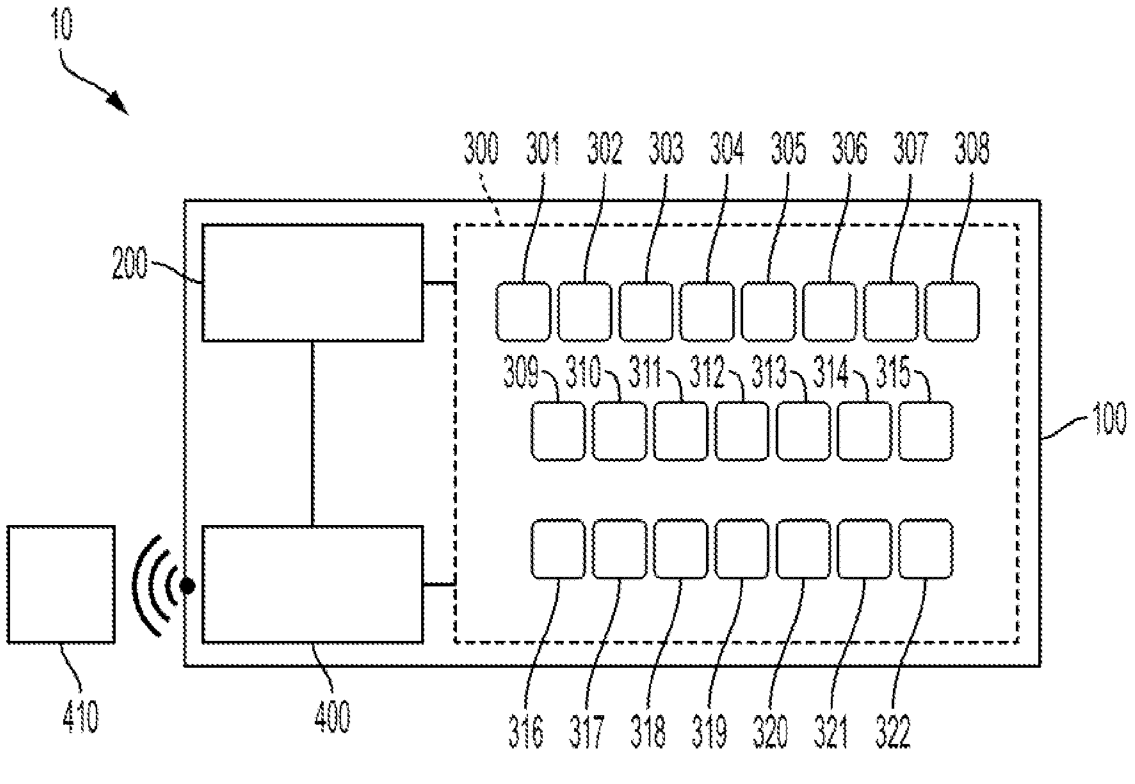
FIG. 4 is a block diagram of an embodiment of a system for monitoring conditions at a location.

FIG. 4 depicts a block diagram of an embodiment of a system (10) for monitoring conditions at a location. As shown in FIG. 4, the system may comprise a sensor array (300) comprising a plurality of data sensors. Like the embodiment shown in FIG. 3, the plurality of data sensors in the embodiment shown in FIG. 4 may comprise at least one thermometer (301), at least one barometer (302), at least one anemometer (303), at least one pyranometer (304), and at least one rain gauge (305). As shown in FIG. 4, each of these data sensors may be physically connected to the superstructure (100) using any of the connection mechanisms described herein. Each of these data sensors may also be electrically connected to the power source (200), which may be of any type of power source described herein.

The embodiment in FIG. 4 also depicts the plurality of data sensors further comprising at least one data sensor selected from the group consisting of at least one photoionization detector (306), at least one hygrometer (307), at least one wind vane (308), at least one ceilometer (309), at least one snow scale (310), at least one piezoelectric sensor (311), at least one transmissometer (312), at least one disdrometer (313), at least one flow meter (314), at least one capacitance meter (315), at least one potentiometer (316), at least one ultraviolet meter (317), at least one photoresistor sensor (318), at least one corona meter (319), at least one acoustic meter (320), at least one optical fiber (321), at least one video camera (322), and combinations thereof. Each of these data sensors may be physically connected to the superstructure (100) using any of the connection mechanisms described herein. Each of these data sensors may also be electrically connected to the power source (200), which may of any type of power source described herein.

As used herein and in the claims, a photoionization detector (306) refers to a device that measures a parameter of small amounts (generally less than 10,000 ppm) of volatile organic compounds and other gases. In general, a photoionization detector may comprise a port for receiving organic compounds, an ultraviolet chamber, and a sensor. As volatile organic compounds enter the photoionization detector through the port, they are bombarded by high-energy ultraviolet (UV) photons which break their molecules into positively charged ions. Those ions produce an electrical current which is then detected by the sensor.

As used herein and in the claims, a hygrometer (307) refers to a device that measures a parameter of the amount of water vapor in air. In general, a hygrometer utilizes changes in electrical capacitance or resistance resulting from the temperature of condensation (i.e.—dew point) to measure differences in humidity.

As used herein and in the claims, a wind vane (308) refers to a device used for determining a directionality of wind parameter. In general, a wind vane may comprise a fixed rod, a rotating ornament, and a fixed directional scale. The fixed directional scale may indicate a number of directions selected from the group consisting of north, south, east, west, northeast, northwest, southeast, southwest, north-northeast, east-northeast, north-northwest, west-northwest, south-southeast, east-southeast, south-southwest, and west-southwest. As wind directionality changes, the rotating ornament rotates about the fixed rod. An extension from the rotating ornament may then be compared to the directions on the fixed directional scale to determine directionality of wind.

As used herein and in the claims, a ceilometer (309) refers to a device used for determining the parameter of height of a cloud ceiling or cloud base using a laser or other light source. In general, a ceilometer utilizes atmospheric lidar to measure the distance between (i.e.—the height) the ceilometer and the base or ceiling of a cloud.

As used herein and in the claims, a snow scale (310) refers to a device that measures the parameter of amount of precipitation in the form of ice crystals (i.e.—snow) over an area in a defined period of time. In general, a snow scale may comprise a catchment container (typically made of copper) and a funnel shaped vessel. Snow enters the snow scale via the catchment container and passes through to the funnel shaped vessel. The snow may then be melted and measured using scales similar to those used for a rain gauge.

As used herein and in the claims, a piezoelectric sensor (311) refers to a device that measures the parameter of changes in pressure, acceleration, temperature, strain, or force using the piezoelectric effect. Piezoelectric sensors may be configured to measure such parameters in transverse operational mode (force applied along a neutral axis displacing charges along the x-axis perpendicular to the line of force), in longitudinal operational mode (force applied is proportional to the amount of charge displaced), or in shear operational mode (charge displaced is generated at a right angle to, and proportional to the force applied).

As used herein and in the claims, a transmissometer (312) refers to a device that measures the extinction coefficient of the atmosphere and sea water parameter and determines visual range. In general, a transmissometer operates by generating a narrow, collimated beam of energy (typically via a laser) through a propagation media, receiving a portion of the energy at a narrow field of view receiver at a designated measurement distance from the source of the beam, and calculating the path transmission and/or extinction coefficient based on the amount of energy received at the receiver.

As used herein and in the claims, a disdrometer (313) refers to a device that measures drop size distribution and velocity parameters of falling hydrometeors such as rain, graupel, hail, and/or snow. In general, disdrometers utilize microwave, laser, or 2D video technology to detect and measure the size and velocity of rain, graupel, hail, or snow.

As used herein and in the claims, a flow meter (314) refers to a device that measures bulk fluid movement parameters through an area. Any number of methods may be utilized to measure bulk flow movement in a flow meter—including, but not limited to—by measuring differential pressure, measuring variable area, measuring positive displacement, measuring vortex shedding, and measuring coriolis force.

As used herein and in the claims, a capacitance meter (315) refers to a device that measures capacitance parameters of a discrete electrical capacitor. In general, capacitance meters operate by attaching a pair of electrodes to a capacitor under test conditions, charging and discharging the capacitor, and measuring the rate of rise of the resulting voltage.

As used herein and in the claims, a potentiometer (316) refers to a device that measures electric potential parameters (i.e. voltage). In general, potentiometers measure these parameters by comparing an unknown voltage (the measured voltage) to a known reference voltage. Different types of potentiometers which function in different ways are known in the art. Types of potentiometers from which the potentiometer may be selected include a law potentiometer, a linear taper potentiometer, and combinations thereof.

As used herein and in the claims, an ultraviolet meter (317) refers to a device that measures ultraviolet radiation parameters. In general, an ultraviolet meter gathers ultraviolet light from the surrounding atmosphere and measures it using the principle of photoelectric conversion.

As used herein and in the claims, a photoresistor sensor (318) refers to a device that measures intensity of incidence light. In general, a photon sensitive surface of the photoresistor sensor receives luminosity (light). The more intense the incidence light, the more the resistance of the photoresistor decreases, which can be used to quantify the intensity of the incidence light.

As used herein and in the claims, a corona meter (319) refers to a device that measures the ionization of a fluid. In general, the air or water surrounding the location is monitored for ionization—which refers to the gain or loss of electrons in the molecules of the air/water. Ionization causes an electrical discharge called corona discharge which may be measured and reported by the corona meter.

As used herein and in the claims, an acoustic meter (320) refers to a device that measures sound pressure parameters. In general, an acoustic meter operates by measuring air pressure applied to a diaphragm as sound waves move through the diaphragm.

As used herein and in the claims, an optical fiber (321) refers to a device that measures one or more parameter consisting of strain, temperature, pressure, vibration, rotation, displacement, acceleration, and torque at the location. The optical fiber may also be used to measure concentration of a compound in the air or water surrounding the location.

As used herein and in the claims, a video camera (322) refers to a device which records and provides a visual record of the overall environment surrounding the system. The video camera may be used to visually observe environmental parameters at or near the location for comparison to one or more of the parameters detected by the remaining sensors of the sensor array.

Figure 5:
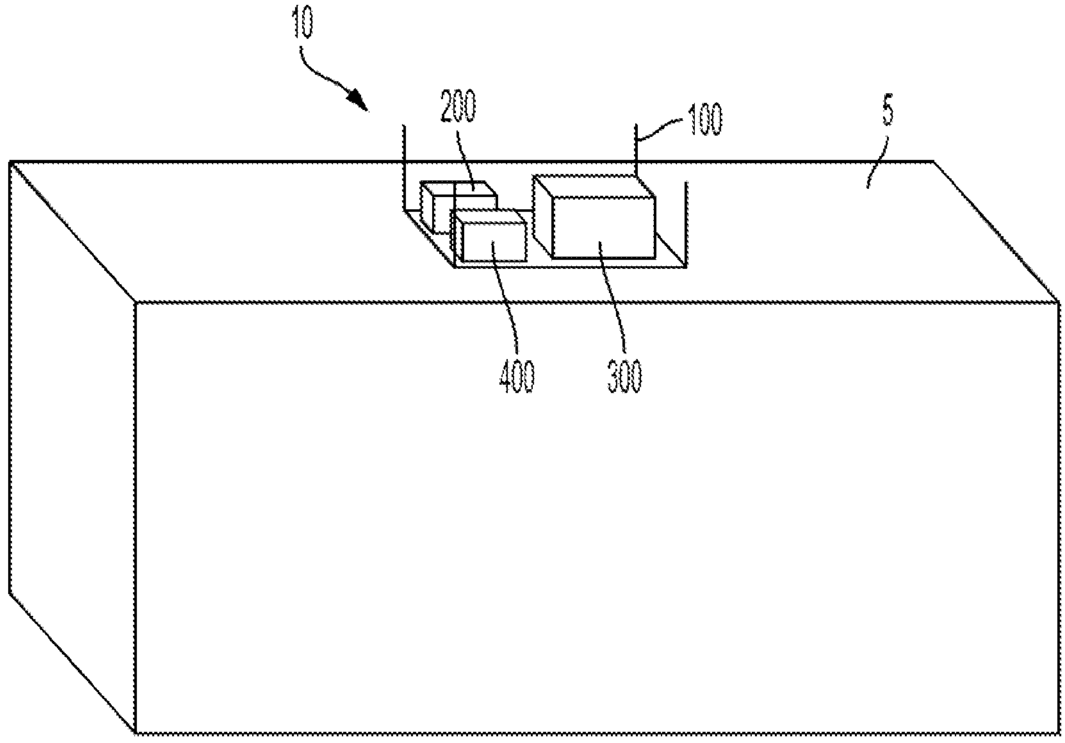
FIG. 5 is a perspective view of a system for monitoring conditions at a location deployed on a roof of a structure.

FIG. 5 depicts an embodiment of the system (10) for monitoring conditions at a location deployed on a roof (5) of a building. As shown in FIG. 5, the superstructure (100) with the power supply (200) (in some embodiments the power supply may be an electrical grid located at the building), sensor array (300), and central processor (400) connected thereto may be placed on the surface of the roof. In some embodiments, the superstructure may be physically connected to the roof by one or more fasteners such as a bolt, a screw, a clamp, or the like.

While the embodiment shown in FIG. 5 comprises a flat roof, also known as a low-slope roof), the system (10) may be deployed on other types of roofs. The type of roof (5) upon which the system may be deployed may be selected from the group consisting of a mono-pitched roof, a pent roof, a multi-pitched roof, a circular roof, and a hyperbolic roof. Alternatively, the system may be deployed on other surfaces such as a parking lot surface, a road surface, a bridge deck, and the like.

The systems and methods described herein allow for accurate inspection and measurement of a variety of parameters in and around the surface. These parameters can be reported to the central processor/receiver in real time where a monitoring service can issue an alert when a parameter is detected which is indicative of the potential need for repair, replacement, or remediation. For example, if the system includes a photoionization detector, and the photoionization detector measures a certain amount of a volatile organic compound known to damage the materials of the surface, the photoionization detector may communicate the measurement through the processor/receiver which may issue an alert that the surface may require repair, replacement, or remediation.

Additionally, the portability of the system, and the adjustability of the position of the various sensors in the sensor array allow the system to be easily deployed to different locations in a short period of time. This reduces the need to permanently attach sensors at or near the surface which may cause permanent structural damage to the surface as a result of such permanent attachment.

What is claimed is:

1. A system (10) for monitoring conditions at a location comprising:

a superstructure (100);

a power supply (200);

a sensor array (300) comprising a plurality of data sensors wherein the plurality of data sensors comprises at least one thermometer (301), at least one barometer (302), at least one anemometer (303), at least one pyranometer (304), and at least one rain gauge (305);

a connection mechanism including a cradle (130) and an adapter (140) including a superstructure fastening mechanism, the cradle connected to the fastening mechanism by a pivot member (150) allowing the cradle to pivot about multiple axes; and a central processor (400) configured to receive a plurality of inputs from the plurality of data sensors and communicate the plurality of inputs to a receiver (410); and wherein each data sensor of the plurality of data sensors is physically connected to the superstructure, and each data sensor of the plurality of data sensors is electrically connected to the power supply, wherein at least individual data sensors of the plurality of data sensors is connected to the cradle (130) such that there are multiple points of contact between an interior surface of the cradle (130) and an exterior surface of the individual data sensor and an orientation of the individual data sensor can be adjusted.

2. The system of claim 1, wherein the at least one rain gauge comprises a type of rain gauge selected from the group consisting of a tipping bucket, a taguchi SnO rain gauge, a differential pH rain gauge, a catalytic LEL rain gauge, an infrared LEL rain gauge, and combinations thereof.

3. The system of claim 1, wherein the at least one thermometer comprises a type of thermometer selected from the group consisting of a radiometric thermometer, an atmospheric thermometer, a contact thermometer, and combinations thereof.

4. The system of claim 1, wherein the plurality of data sensors further comprises at least one data sensor selected from the group consisting of at least one photoionization detector (306), at least one hygrometer (307), at least one wind vane (308), at least one ceilometer (309), at least one snow scale (310), at least one piezoelectric sensor (311), at least one transmissometer (312), at least one disdrometer (313), at least one flow meter (314), at least one capacitance meter (315), at least one potentiometer (316), at least one ultraviolet meter (317), at least one photoresistor sensor (318), at least one corona meter (319), at least one acoustic meter (320), at least one optical fiber (321), at least one video camera (322), and combinations thereof.

5. The system of claim 4, wherein the plurality of data sensors comprises the at least one potentiometer selected from the group consisting of a law potentiometer, a linear taper potentiometer, and combinations thereof.

6. The system of claim 1, wherein the power supply is selected from the group consisting of solar, wind, battery, or hard wires to an electric grid.

7. The system of claim 6, wherein the superstructure comprises a base (110) and a plurality of arms (120) extending from the base.

8. The system of claim 7, wherein each arm of the plurality of arms is pivotably connected to the base by a hinge.

9. The system of claim 8, wherein the base comprises a plurality of base perimeter members (112).

10. The system of claim 9, wherein two opposing base perimeter members of the plurality of base perimeter members comprise a hinge located equidistant from one another along a length dimension of the respective base perimeter member.

11. The system of claim 8, wherein the location is a roof (5) of a building, and the superstructure is configured to be physically connected to at least a portion of the roof of the building.

12. The system of claim 9, wherein the location is a roof (5) of a building, and the superstructure is configured to be physically connected to at least a portion of the roof of the building.

13. The system of claim 7, wherein the base comprises a plurality of base perimeter members (112).

14. The system of claim 13, wherein two opposing base perimeter members of the plurality of base perimeter members comprise a hinge located equidistant from one another along a length dimension of the respective base perimeter member.

15. The system of claim 7, wherein the location is a roof (5) of a building, and the superstructure is configured to be physically connected to at least a portion of the roof of the building.

16. The system of claim 1, wherein the superstructure comprises a base (110) and a plurality of arms (120) extending from the base.

17. The system of claim 16, wherein each arm of the plurality of arms is pivotably connected to the base by a hinge.

18. The system of claim 16, wherein the base comprises a plurality of base perimeter members (112).

19. The system of claim 18, wherein two opposing base perimeter members of the plurality of base perimeter members comprise a hinge located equidistant from one another along a length dimension of the respective base perimeter member.

20. The system of claim 1, wherein the location is a roof (5) of a building, and the superstructure is configured to be physically connected to at least a portion of the roof of the building.

* * * * *